United States Patent [19]

Andersen, III

[11] Patent Number: 5,410,488
[45] Date of Patent: Apr. 25, 1995

[54] PROXIMITY SENSOR GAP MEASURING METHOD AND APPARATUS

[75] Inventor: John M. Andersen, III, Coronado, Calif.

[73] Assignee: Lorton Aerospace Company, Coronado, Calif.

[21] Appl. No.: 970,020

[22] Filed: Nov. 2, 1992

[51] Int. Cl.$^6$ ............................................. G01B 27/26
[52] U.S. Cl. .................................. 364/482; 364/561; 324/202; 324/601
[58] Field of Search ....................... 324/202, 601, 612; 336/30; 364/481, 482, 561, 577.01, 571.02, 571.03, 571.04, 571.05, 571.06, 571.07, 571.08

[56] References Cited

U.S. PATENT DOCUMENTS

| | | | |
|---|---|---|---|
| 4,219,740 | 8/1980 | Little | 340/686 |
| 4,827,248 | 5/1989 | Crudden et al. | 340/686 |
| 4,845,429 | 7/1989 | Burreson | 324/234 |
| 5,066,912 | 11/1991 | Kwiatkowski | 324/202 |
| 5,148,107 | 9/1992 | Finger et al. | 324/207.26 |

OTHER PUBLICATIONS

Eldec Corporation, "Operators Manual With Illustrated Parts List", Nov. 1, 1985.

*Primary Examiner*—Ellis B. Ramirez
*Assistant Examiner*—Craig Steven Miller
*Attorney, Agent, or Firm*—Brown, Martin, Haller & McClain

[57] ABSTRACT

A device for testing a proximity sensor and precisely measuring the rigging gap between the sensor and its metal target. The sensor is stimulated with a signal of a known frequency and sensor impedance or a component thereof, such as inductance, is measured. The measured value is converted into gap width using a lookup table. The gap width may be displayed to the operator or automatically compared to an optimal range of gap widths for a sensor of the type under test. An operator may also test the sensor using a precision tool that has a dielectric spacer of a known width attached to a metal target. While the operator holds the tool with the spacer in contact with the face of the sensor, the present invention measures impedance and converts it into a gap width. The gap width should equal the known width of the spacer if the sensor is functioning properly. If the difference between the known spacer width and the measured width is less than a predetermined tolerance, the difference may be stored as a gap error. This gap error is used to offset subsequent measurements of the gap between an installed sensor and its target before the measurements are displayed.

24 Claims, 2 Drawing Sheets

PROXIMITY SENSOR GAP MEASURING METHOD AND APPARATUS

BACKGROUND OF THE INVENTION

The present invention relates generally to a device for measuring the air gap between a proximity sensor and its target and, more specifically, to a device for determining whether a proximity sensor in the door of an aircraft is installed correctly and functioning properly.

A proximity sensor is a well-known device that may be used in a system for detecting the presence of a metallic target within a threshold distance from the sensor. A proximity sensor has a complex impedance and is electrically equivalent to an inductor in series with a small resistor. Such proximity sensors are often referred to as "variable reluctance" devices because the presence of the metallic target in close proximity to a sensor inductively varies the sensor impedance. This variation in sensor impedance can be sensed by electronic circuitry, which can thus provide an indication of the presence or absence of the target in close proximity to the sensor. Because most such sensors have two leads for connecting the sensor to the electronic circuitry, they are known as "two-wire" sensors. Some proximity sensors, however, include a third lead that allows the electronic circuitry to compensate for the resistance of the wires connected to the other two leads. Such sensors are known as "three-wire" sensors.

Proximity sensors are commonly used aboard aircraft to detect whether a mechanical device, such as a cargo door, landing gear, control surface, or thrust reverser, is properly positioned. The electronic circuitry may be connected to a status light in the cockpit to provide the pilot with an indication of the position of the mechanical device.

To detect the position of a cargo door, for example, the target is installed inside the door and the sensor is installed in the door frame such that the sensor and target are adjacent and separated by a small air gap when the door is in the fully-closed position. This gap is known as the "rigging gap" and may be specified by the manufacturer of the sensor. Aircraft manufacturers installing a proximity sensor and maintenance personnel inspecting a proximity sensor must ensure that the gap is properly set to provide reliable position detection.

Cockpit status indicators may provide incorrect position indications if either the sensor itself or the electronic circuitry connected to the sensor, including the status light, fails. Sensors are susceptible to many types of failures. In one common failure mode, for example, the electrical resistance of the sensor increases. In addition to sensor failure, aircraft vibration or other physical movement may alter the positions of the target or sensor relative to one another, thereby changing the rigging gap and possibly preventing the sensor from detecting the target. Isolating the source of such sensor system problems to either the sensor itself or the associated sensor electronics can be a difficult and time consuming task.

Practitioners have developed methods for testing proximity sensors, such as measuring sensor resistance, to isolate the cause of sensor problems. However, the rigging gap is often difficult or impossible to measure because the sensor and target may be inaccessible when the mechanical structures in which they are installed are in close proximity, such as when a cargo door is in the closed position. Moreover, the target is sometimes completely embedded in the structure where it is not only inaccessible but also hidden from view.

Several methods are known that may be used to measure the gap where the sensor and target are accessible. In one such method, thin feeler gauges having known widths are wedged between the sensor and target. The sum of the widths of the gauges equals the rigging gap. As discussed above, this method is unsuitable for measuring the gap where insufficient room exists to allow the gauges to be inserted. For example, the shape of a cargo door may prevent anything from being inserted between the door and its surrounding frame.

In another such method, a wad of putty or modeling clay is placed on the sensor face while the target and sensor are separated, such as when a cargo door is open. When the cargo door is shut, the modeling clay is compacted to approximately the sensor target gap distance. The door is then opened and the compacted modeling clay is retrieved and measured with calipers. This method can provide a rough rigging gap measurement where insufficient room exists to wedge feeler gauges between the mechanical structures. However, this method is unsuitable for measuring a rigging gap between a sensor and a target installed in mechanical structures that slide relative to one another rather than swing on hinges. In such structures, feeler gauges or modeling clay inserted between the two portions may not only be difficult to align between the sensor and target but could easily be broken, deformed or otherwise rendered unretrievable by the sliding structures.

In addition to the methods discussed above, an electromechanical device for measuring the rigging gap of proximity sensors installed in aircraft has been produced by ELDEC Corporation of Lynnwood, Wash. and is described in "Operator's Manual with Illustrated Parts List," ELDEC Document No. 011-2851-104, Nov. 1, 1985. The ELDEC device has mounted within it a reference proximity sensor and a reference target. The reference sensor and target are separated by a gap, which an operator can manually adjust using a vernier screw adjustment that displays the gap in inches. The ELDEC device has electronic circuitry, including an indicator lamp, that is connected to the reference sensor and duplicates the aircraft electronics to which the sensor to be tested is connected.

To use the ELDEC device to measure the rigging gap of a sensor, an operator disconnects the sensor leads from the aircraft electronics and connects them to terminals on the ELDEC device. The device has a switch that connects the electronics in the device to either the sensor-under-test or the reference sensor. The operator manually sets the switch to connect the device electronics to the sensor-under test. The operator then manually adjusts a potentiometer on the device until the indicator lamp is activated. The operator then sets the switch to connect the device electronics to the reference sensor and adjusts the vernier screw until the indicator lamp is activated. At that time, the impedance of the sensor-under-test is approximately equal to the impedance of the reference sensor. Thus, if the reference sensor and the sensor-under-test are of the same type, i.e., they have identical impedances at any given distance from a target, the gap between the sensor-under-test and its target should at that time be equal to the gap between the reference sensor and its target, which the operator can read on the vernier display. However, because different types of sensors are commonly used, an operator must use a printed conversion table to convert the measured gap into a corresponding gap measurement for a sensor of the type under test.

Although the ELDEC device overcomes several of the problems involved in proximity sensor gap measurement, the ELDEC device does not test sensor operation. As a result, rigging gap measurements may be inaccurate because the sensor is not functioning properly. Moreover, using a conversion table developed from empirical data may introduce undesirable error into the gap measurement. Furthermore, contrary to the assumption underlying the use of the ELDEC device, the electronics in the ELDEC device may not be exactly identical to that in the aircraft.

A system that both tests sensor operation and precisely measures the rigging gap without dependence upon additional sources of error, such as reference sensors, would be highly desirable. These problems and deficiencies are clearly felt in the art and are solved by the present invention in the manner described below.

SUMMARY OF THE INVENTION

The present invention tests the operation of a proximity sensor and precisely measures the rigging gap between the sensor and its target. To measure rigging gap, an operator disconnects the sensor leads from the sensor electronics and connects them to terminals on the present invention. The mechanical structure in which the sensor and target are installed is moved to a position in which the sensor and target are adjacent, such as the closed position of a cargo door. The sensor is stimulated with a signal having a known frequency and the sensor impedance or a component thereof, such as inductance or resistance, is measured directly. The present invention then uses a lookup table to convert the measured value into gap width. The lookup table may be developed using empirical data.

The gap width may be displayed to the operator or automatically compared to an optimal range of gap widths. This range may be obtained from a lookup table that produces the optimal range of gap widths for the types of proximity sensors likely to be tested, which can be obtained empirically or from sensor manufacturers' specifications. A gap width error indication is provided to the operator if the measured gap exceeds the optimal range.

The present invention may also test a sensor for proper operation. To test a sensor, sensor impedance or a component thereof is measured while the sensor and target are separated by a dielectric spacer having a known width. A convenient test tool may comprise a metallic target bonded to a dielectric spacer having a known thickness, which is placed directly against the sensor during the test. The measured values are compared to optimal ranges. The ranges may be obtained from lookup tables that include the optimal range of values for the types of proximity sensors likely to be tested. An indication of sensor failure is provided if any of the measured values exceed the optimal ranges.

An operator may also calibrate the present invention to compensate for undesirable effects such as stray capacitance and resistance. First, the sensor is preferably tested for proper operation as described above. Then, the gap of a test tool, which is the width of the dielectric spacer, is measured as described above. The present invention may store a value equal to any difference between the measured gap and the width of the dielectric spacer. This stored gap error value may then be added to gap measurements before displaying them to the operator.

The foregoing, together with other features and advantages of the present invention, will become more apparent when referring to the following specification, claims, and accompanying drawings.

BRIEF DESCRIPTION OF THE DRAWINGS

For a more complete understanding of the present invention, the following detailed description of the embodiments illustrated in the accompanying drawings are now referred to, wherein.

DESCRIPTION OF THE PREFERRED EMBODIMENTS

Figure 1:
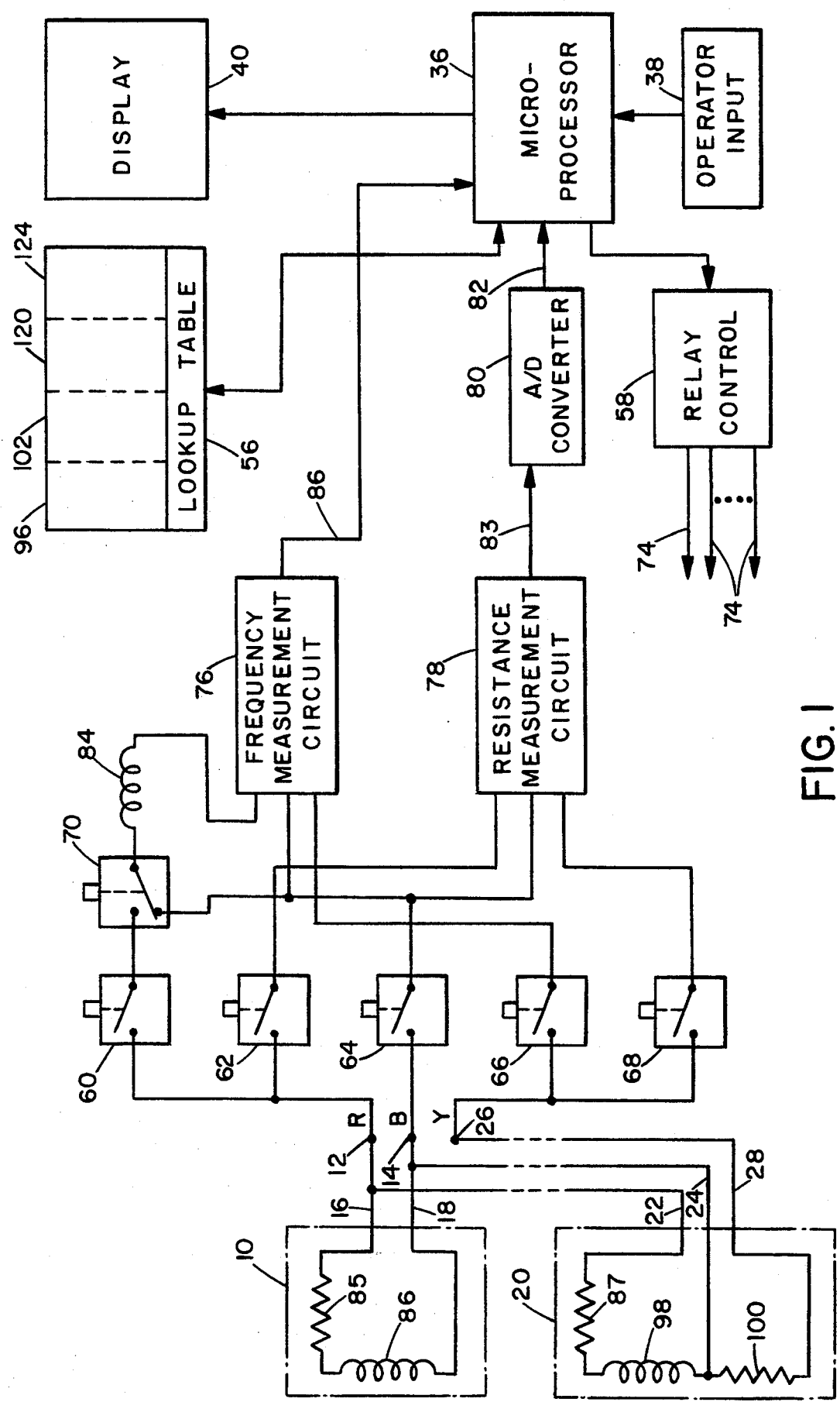
FIG. 1 is a schematic diagram of a device for testing a proximity sensor and measuring sensor rigging gap.
Figure 4:
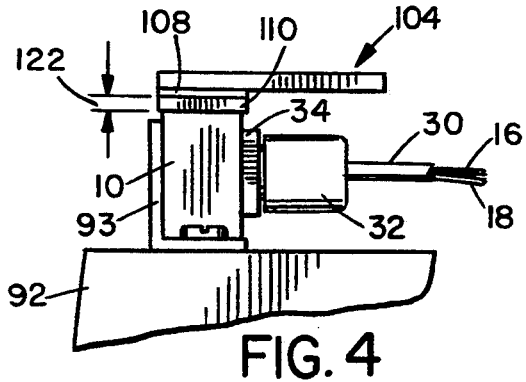
FIG. 4 shows a test tool resting against the face of a proximity sensor.

In FIG. 1, a two-wire proximity sensor 10, which is not part of the present invention, is connected to terminals 12 and 14 of the present invention using leads 16 and 18, respectively. Because leads 16 and 18 commonly have identifying colors such as red (R) and blue (B), respectively, terminals 16 and 18 may be identified by corresponding colors. Similarly, a three-wire sensor 20, which is not part of the present invention, may be connected to terminals 12 and 14 using leads 22 and 24. Sensor 20 is also connected to a third terminal 26 using lead 28, which may have an identifying color such as yellow (Y). As shown in FIG. 4, leads 16 and 18 may be constructed using a suitable cable 30 having a connector 32 that mates with a connector 34 of sensor 10. Leads 22, 24 and 28 may be constructed in a similar manner.

Figure 2:
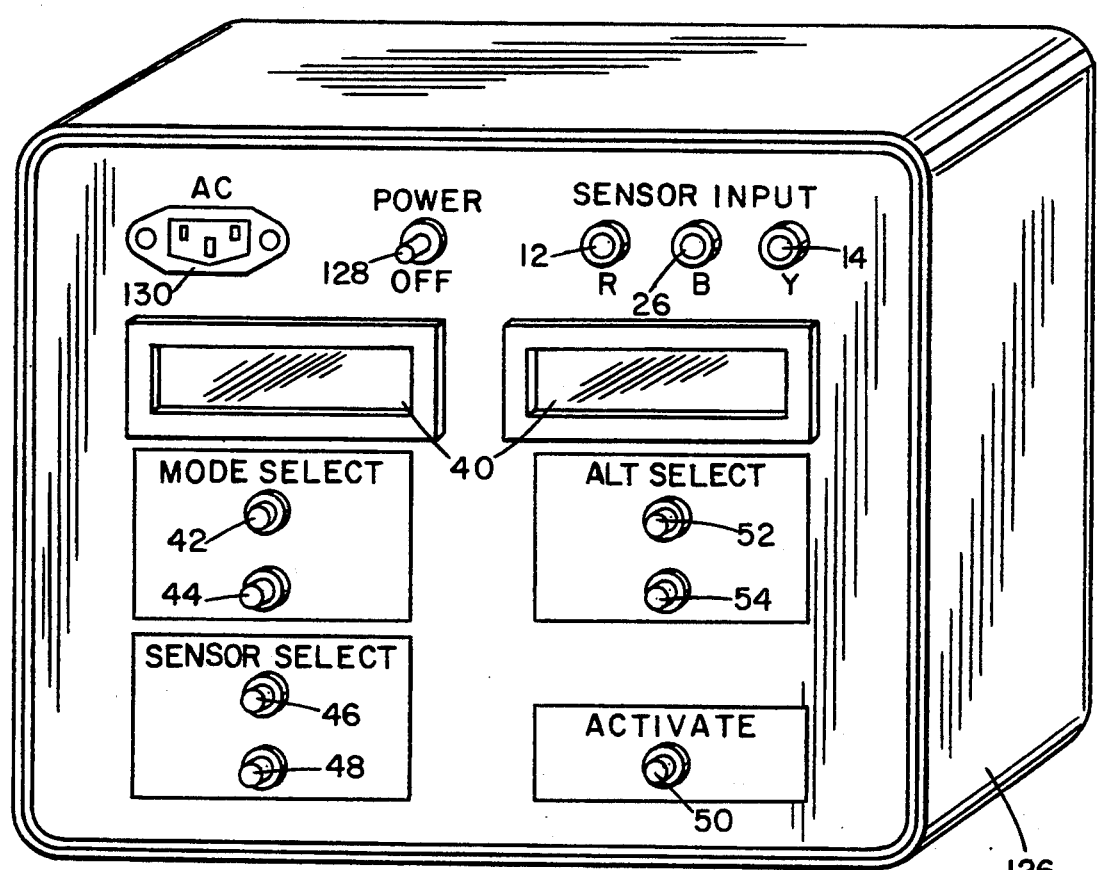
FIG. 2 illustrates a control panel for operating the device.

A microprocessor 36 receives operator commands, which are described in further detail below, from a suitable input device such as a keypad 38 and provides output indications to a suitable output device such as a display 40. As shown in FIG. 2, keypad 38 may comprise two mode-select buttons 42 and 44, two sensor-select buttons 46 and 48, and an activate button 50. In addition, two alternate-select buttons 52 and 54 may be provided for additional functions not described herein. Buttons 42-54 are switches that may be of the momentary-contact type. Microprocessor 36 operates in accordance with suitable software, which is stored in a portion of memory 56. Memory 56 is preferably a nonvolatile memory such as erasable programmable read-only memory (EPROM).

Microprocessor 36 is also connected to a relay controller 58, which is connected to relays 60, 62, 64, 66, 68, and 70. Relay controller 58 controls relays 60-70 independently of one another using control signals 74.

Microprocessor 36 can close relays 60 and 64 and set relay 70 to connect leads 16 and 18 of two-wire sensor 10 to a frequency measurement circuit 76 through an inductor 84. Alternatively, microprocessor 36 can close relays 62 and 64 to connect leads 16 and 18 of sensor 10 to a resistance measurement circuit 78. Microprocessor 36 can also close relay 68 to connect lead 28 of three-wire sensor 20 to resistance measurement circuit 78.

Relay 66 is not required, but provides additional switching flexibility. This arrangement of relays 62–68 allows microprocessor 36 to isolate frequency measurement circuit 76 from resistance measurement circuit 78 to prevent one circuit from applying damaging signals to the other.

Frequency measurement circuit 76 provides a frequency signal 86 to microprocessor 36. Resistance measurement circuit 78 provides a resistance measurement signal 83 to an analog-to-digital converter 80, which in turn provides a resistance value 82 to microprocessor 36. Analog-to-digital converter 80 may include a suitable scaling circuit to produce a convenient range of resistance values 82.

When resistance measurement circuit 78 is connected to sensor 10 as described above, microprocessor 36 may cause resistance measurement circuit 78 to apply a small direct current, such as one milliampere (mA), to terminals 12 and 14 of sensor 10. Resistance measurement signal 83 has a voltage that corresponds to the voltage across the resistive component 85 of sensor 10. Microprocessor 36 may read resistance value 82 from analog-to-digital converter 80 and calculate the resistance of resistive component 85 using Ohm's Law. When resistance measurement circuit 78 is connected to a three-wire sensor such as sensor 20, the method described above may be used to calculate the resistance of resistive component 87 of sensor 20.

Frequency measurement circuit 76 oscillates when an inductance is connected to it. Any suitable circuit for producing oscillations, such as a tank circuit, may be used in frequency measurement circuit 76. Such circuits are easily constructed by a person skilled in the art. Microprocessor 36 can set the positions of relays 60, 64, and 70 to connect frequency measurement circuit 76 either to an inductor 84 or to both inductor 84 and sensor 10. When connected to only inductor 84, frequency measurement circuit 76 oscillates at a frequency determined by the inductance of inductor 84. When connected to both inductor 84 and sensor 10, frequency measurement circuit 76 oscillates at a frequency determined by the inductance of inductor 84 in series with the inductive component 86 of sensor 10. When frequency measurement circuit 76 is connected to a two-wire sensor, such as sensor 10, the value of inductor 84 should be chosen to ensure an oscillation frequency between approximately one and ten kilohertz (kHz). However, when frequency measurement circuit 76 is connected to a three-wire sensor, such as sensor 20, the value of inductor 84 should be chosen to ensure an oscillation frequency between approximately one and two kHz because dissipative loss in such sensors increases to undesirable levels at high frequencies, as known in the art. These frequency ranges can be determined by reference to information provided by sensor manufacturers, of which the ranges provided above are exemplary.

Frequency measurement circuit 76 oscillates at a different frequency when only inductor 84 is connected to it than it does when both inductor 84 and sensor 10 are connected to it. Frequency signal 86 has a frequency equal to the frequency at which frequency measurement circuit 76 oscillates and an amplitude that can be detected by microprocessor 36. Microprocessor 36 can measure these frequencies by monitoring frequency signal 86 and counting the number of pulses that it receives from analog-to-digital converter 80 during a sampling time, such as a few milliseconds.

Microprocessor 36 can then calculate the inductive component 86 of sensor 10 using the equation below.

$$L = L_0(f_1/f_2 - 1) \qquad (1)$$

where:
- L is the inductance of inductive component 86 of sensor 10;
- $L_0$ is the known inductance of inductor 84;
- $f_1$ is the oscillation frequency of the circuit when both inductor 84 and sensor 10 are connected to the circuit; and
- $f_2$ is the oscillation frequency of the circuit when only inductor 84 is connected to the circuit.

Figure 5:
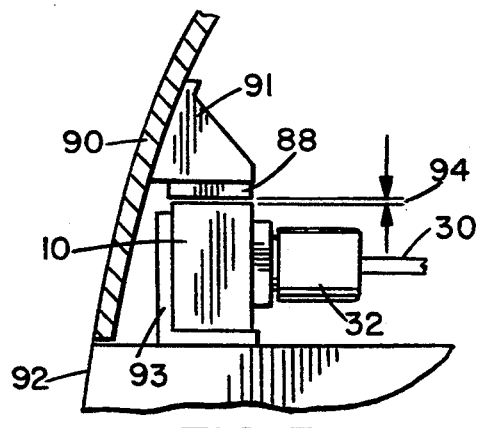
FIG. 5 shows a proximity sensor mounted in an aircraft door.

In FIG. 5, a target 88 is mounted on an aircraft cargo door 90 using a suitable target mounting bracket 91, and sensor 10 is mounted on the door frame 92 using a suitable sensor mounting bracket 93. When door 90 is in the closed position as shown in FIG. 5, a rigging gap 94 exists between target 88 and the face of sensor 10. Using the calculated inductance L of sensor 10 as an index, microprocessor 36 can obtain a value corresponding to the width of rigging gap 94 from a lookup table 96, which is stored in memory 56. Each location in lookup table 96 corresponds to an inductance value, and a gap width value is stored in that location. The relation between inductance L and gap width that is stored in lookup table 96 may be empirically determined.

Although microprocessor 36 may use the method described above to calculate the inductance of the inductive component 98 of sensor 20, which is a three-wire sensor, it must perform an additional calculation before obtaining a value corresponding to the width of rigging gap 94 from a lookup table. When such a three-wire sensor is used in an aircraft, the aircraft electronics (not shown) use the third wire to compensate for the resistance of the wires connecting the sensor to the electronics. In the present invention, resistance measurement circuit 78 measures the resistance of resistive component 87 between terminals 12 and 14 by applying a direct current, as described above. In the same manner, it also measures the resistance of resistor 100 between terminals 14 and 26. Microprocessor 36 can then calculate a bridge ratio, r, using the equation below.

$$r = (2\pi f_1 L + R_1)/R_2 \qquad (2)$$

where:
- L is the inductance of inductive component 98 of sensor 20;
- $f_1$ is the oscillation frequency of the circuit when both inductor 84 and sensor 20 are connected to the circuit;
- $R_1$ is the resistance of resistive component 87 of sensor 20; and
- $R_2$ is the resistance of resistor 100 of sensor 20.

Using the bridge ratio r as an index, microprocessor 36 can obtain a value corresponding to the width of rigging gap 94 from another lookup table 102, which is stored in memory 56. Each location in lookup table 102 corresponds to a bridge ratio, and a gap width value is stored in that location. The relation between bridge ratio and gap width that is stored in lookup table 102 may be empirically determined.

In operation, an operator (not shown) disconnects sensor 10 from the aircraft electronics and connects the sensor to terminals 12 and 14 of the present invention. The operation of the present invention is described herein generally with respect to sensor 10, and will only refer to sensor 20 to the extent that differences between a two-wire sensor such as sensor 10 and a three-wire sensor such as sensor 20 affect the operation. In the absence of a reference to sensor 20, the present invention may be used in substantially the same manner with respect to both two-wire and three-wire sensors.

Microprocessor 36 provides a menu of operating modes and sensor types on display 40, which may be an alphanumeric liquid crystal display (LCD). In FIG. 2, the operator may use sensor-select buttons 46 and 48 to scroll forward and backward through a menu. The menu items for selecting a sensor type may consist of the part numbers that manufacturers imprint on the sensors. The operator uses button 50 to select the sensor type that matches the part number (not shown) on sensor 10.

The operator then uses mode-select buttons 42 and 44 to select a mode by scrolling forward and backward through a menu. The menu items include a TEST SENSOR mode, a DISPLAY SENSOR GAP mode, a DISPLAY SENSOR RESISTANCE mode, and a DISPLAY IMPROVED GAP mode. The operator uses button 50 to select a mode.

Figure 3A:
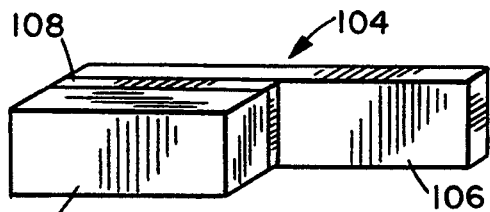
FIGS. 3A-3B show tools for testing a proximity sensor and calibrating the device.
Figure 3B:
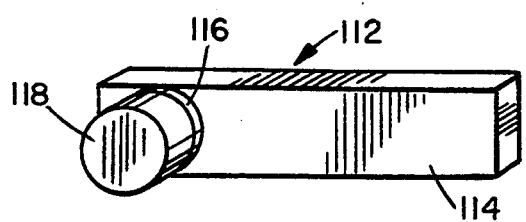

A special precision target tool 104, shown in FIG. 3A, is used in TEST SENSOR mode and DISPLAY IMPROVED GAP mode. Tool 104 comprises a handle 106, a metallic target 108, and a dielectric spacer 110 bonded together using a suitable adhesive. A similar tool 112, shown in FIG. 3B, comprises a handle 114, a metallic target 116, and a dielectric spacer 118.

To test a sensor, the operator places dielectric spacer 110 of tool 104, for example, against the face of sensor 10, as shown in FIG. 4. Holding tool 104 in place, the operator selects TEST SENSOR mode, and the microprocessor 36 measures both sensor resistance and sensor inductance. As described above, microprocessor 36 uses lookup table 96 and Equation 1 if sensor 10 is under test and uses lookup table 102 and Equations 1 and 2 if sensor 20 is under test.

Microprocessor 36 uses the selected sensor type as an index to obtain a range of resistance values from a lookup table 120, which is stored in memory 56. Microprocessor 36 compares the measured resistance to the range of resistance values and provides a sensor failure indication on display 40 if the measured resistance exceeds the range. A single resistance value may be stored at each location in lookup table 120, and microprocessor 36 may add and subtract a fixed tolerance from the stored resistance value to obtain upper and lower limits, respectively, for the range.

If the range of resistance values is not exceeded, microprocessor 36 converts the measured inductance into a gap width value, as described above. Microprocessor 36 uses the selected sensor type as an index to obtain a range of gap width values from a lookup table 124 stored in memory 56. The range corresponds to the width 122 of dielectric spacer 110 plus or minus a fixed tolerance and may be determined with any desired precision by measuring width 122 of dielectric spacer 110 using a precision measuring device such as calipers. Microprocessor 36 compares the gap width value to the range of gap width values and, if the range is exceeded, provides a sensor failure indication on display 40. If the range is not exceeded, microprocessor 36 provides an indication on display 40 that the sensor is functioning properly. The operator may remove tool 104 after the test is completed.

To measure rigging gap, the operator closes the cargo door, as shown in FIG. 5. The operator selects DISPLAY SENSOR GAP mode, and the present invention measures gap 94 and displays it on display 40. As described above, microprocessor 36 uses lookup table 96 and Equation 1 if sensor 10 is under test and uses lookup table 102 and Equations 1 and 2 if sensor 20 is under test. In this mode, microprocessor 36 may also use the selected sensor type as an index to obtain a range of gap width values from a lookup table 124. Microprocessor 36 compares the measured gap width to the range of gap width values and provides a sensor failure indication on display 40 if the measured gap width exceeds the range.

The present invention measures sensor resistance. In all operational modes, microprocessor 36 compares the measured resistance to the range of resistance values obtained from lookup table 120 and provides a sensor failure indication on display 40 if the measured resistance exceeds this range.

If a sensor is determined to be functioning properly, the operator may wish the present invention to correct any measured gap width values to compensate for errors caused by stray capacitance or resistance before displaying any gap width values. The operator may use TEST SENSOR mode, as described above, to make the initial determination that sensor 10 is functioning properly. The operator then places dielectric spacer 110 of tool 104, for example, against the face of sensor 10, as shown in FIG. 4. Holding tool 104 in place, the operator selects DISPLAY IMPROVED GAP mode, and microprocessor 36 obtains a gap width value, as described above. Microprocessor 36 then calculates the arithmetic difference between this gap width value and width 122 of dielectric spacer 110 and stores the difference or "gap error" in memory 56. The gap error will be less than the acceptable tolerance for a sensor of the type under test because the sensor is assumed to be functioning properly. In this mode, microprocessor 36 adds this stored difference to any subsequent gap measurements before displaying them on display 40.

The software may provide other modes in addition to those described above. For example, a UNITS SELECT mode may be used to change the units in which gap width is displayed between millimeters and inches. Also, a DISPLAY STATUS mode may be used to test whether a mechanical or reed switch (not shown) connected to terminals 12 and 14 is in the open or closed position by measuring resistance.

The present invention is preferably enclosed in a portable case 126 having a power switch 128 and is preferably powered by an internal battery (not shown). However, the present invention may be powered by connecting the power connector 130 to a standard electrical outlet or aircraft electrical power using a suitable cable (not shown).

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. An apparatus for measuring a gap between a target and a proximity sensor, said sensor having first and second leads, comprising:

terminals for connecting said first and second leads of said sensor;

impedance measurement means selectably connected to said terminals for directly measuring a property of sensor impedance;

conversion means for converting said measured property to a value corresponding to said gap in response to a predetermined relationship between said property of sensor impedance and said gap, said predetermined relationship comprising a plurality of pairs of values of said property and said gap; and display means for displaying said value corresponding to said gap.

2. The apparatus for measuring a gap between a target and a proximity sensor described in claim 1, wherein said property of sensor impedance is sensor inductance.

3. The apparatus for measuring a gap between a target and a proximity sensor described in claim 2, further comprising selection means for selecting one of a plurality of sensor types.

4. The apparatus for measuring a gap between a target and a proximity sensor described in claim 3, wherein said conversion means comprises a first memory area for storing said predetermined relationship between said sensor inductance and said gap.

5. The apparatus for measuring a gap between a target and a proximity sensor described in claim 4, further comprising gap comparison means for comparing said value corresponding to said gap to a predetermined range of gap values corresponding to said selected sensor type and for providing an indication if said gap is not within said predetermined range of gap values.

6. The apparatus for measuring a gap between a target and a proximity sensor described in claim 5, wherein said gap comparison means further comprises a second memory area for storing a plurality of predetermined ranges of gap values, each said predetermined range of gap values corresponding to one sensor type of said plurality of sensor types.

7. The apparatus for measuring a gap between a target and a proximity sensor described in claim 6, wherein said impedance measurement means comprises:

an inductor having an inductance; and first switching means for selectably forming a circuit having either said inductor and not said sensor or both said sensor and said inductor, said circuit oscillating at a first frequency when said circuit has only said inductor and oscillating at a second frequency when said circuit has both said inductor and said sensor.

8. The apparatus for measuring a gap between a target and a proximity sensor described in claim 7, wherein said impedance measurement means computes said sensor inductance in response to said first frequency, said second frequency, and said inductance of said inductor.

9. The apparatus for measuring a gap between a target and a proximity sensor described in claim 8, further comprising:

resistance measurement means for measuring resistance;

second switching means for selectably connecting said resistance measurement means to said sensor;

resistance comparison means for comparing said measured resistance to a predetermined range of resistance values corresponding to said selected sensor type and for providing an indication if said measured resistance is not within said predetermined range of resistance values.

10. The apparatus for measuring a gap between a target and a proximity sensor described in claim 9, wherein said resistance comparison means further comprises a third memory area for storing a plurality of said predetermined ranges of resistance values, each said predetermined range of resistance values corresponding to one sensor type of said plurality of sensor types.

11. A method for testing a proximity sensor separated by a gap from a target, said sensor having a sensor impedance, comprising the steps of:

directly measuring a property of said sensor impedance; and converting said measured property to a gap value in response to a predetermined relationship between said property and said gap, said predetermined relationship comprising a plurality of pairs of values of said property and said gap.

12. The method for testing a proximity sensor separated by a gap from a target described in claim 11, further comprising the step of displaying said gap value.

13. The method for testing a proximity sensor separated by a gap from a target described in claim 11, further comprising, before said measuring step, the step of selecting a sensor type from a plurality of sensor types.

14. The method for testing a proximity sensor separated by a gap from a target described in claim 13, wherein said sensor is separated from said target by a dielectric spacer having a width, said dielectric spacer in contact with said sensor and said target.

15. The method for testing a proximity sensor separated by a gap from a target described in claim 14, wherein said step of measuring a property of said sensor impedance comprises the step of measuring sensor inductance.

16. The method for testing a proximity sensor separated by a gap from a target described in claim 15, wherein said step of measuring sensor inductance comprises the steps of:

generating a first oscillation frequency in a circuit having an inductor, said inductor having an inductance;

measuring said first oscillation frequency;

connecting said sensor to said circuit having said inductor;

measuring a second oscillation frequency in said circuit; and computing said sensor inductance in response to said first oscillation frequency, said second oscillation frequency, and said inductance of said inductor.

17. The method for testing a proximity sensor separated by a gap from a target described in claim 15, further comprising the steps of:

measuring sensor resistance;

comparing said sensor resistance to a predetermined range of sensor resistances corresponding to said selected sensor type; and providing an indication if said measured sensor resistance is not within said predetermined range of sensor resistances.

18. The method for testing a proximity sensor separated by a gap from a target described in claim 17, further comprising the steps of:

comparing said gap value to a predetermined range of gap values corresponding to said selected sensor type; and providing an indication if said gap value is not within said predetermined range of gap values.

19. The method for testing a proximity sensor separated by a gap from a target described in claim 11, wherein said target and said proximity sensor are attached to respective mechanical parts movably connected to each other.

20. The method for testing a proximity sensor separated by a gap from a target described in claim 19, wherein said mechanical parts are on an aircraft.

21. The method for testing a proximity sensor separated by a gap from a target described in claim 20, wherein one said mechanical part is an aircraft door.

22. A method for calibrating an apparatus for measuring a gap between a target and a proximity sensor having an impedance, comprising:
   forming a dielectric spacer having a width;
   disposing said spacer adjacent to and in contact with said sensor;
   disposing a metallic target adjacent to and in contact with said spacer;
   measuring a property of said sensor impedance;
   converting said measured property to a gap value in response to a predetermined relationship between said property and said gap;
   computing the difference between said gap value and said width of said dielectric spacer; and
   storing said difference in a memory.

23. The method for calibrating an apparatus for measuring a gap between a target and a proximity sensor described in claim 22, wherein said step of measuring a property of said sensor impedance comprises the step of measuring sensor inductance.

24. The method for calibrating an apparatus for measuring a gap between a target and a proximity sensor described in claim 23, wherein said step of measuring sensor inductance comprises the steps of:
   generating a first oscillation frequency in a circuit having an inductor, said inductor having an inductance;
   measuring said first oscillation frequency in said circuit;
   connecting said sensor to said circuit having said inductor;
   measuring a second oscillation frequency in said circuit; and
   computing said sensor inductance in response to said first oscillation frequency, said second oscillation frequency, and said inductance of said inductor.

* * * * *